May 30, 1939.    K. FRITZ    2,160,135
DIRECTION FINDING SYSTEM
Filed March 27, 1936

INVENTOR
KARL FRITZ
BY
ATTORNEY

Patented May 30, 1939

2,160,135

UNITED STATES PATENT OFFICE 2,160,135

DIRECTION FINDING SYSTEM

Karl Fritz, Berlin, Germany, assignor to Telefunken Gesellschaft für Drahtlose Telegraphie m. b. H., Berlin, Germany, a corporation of Germany Application March 27, 1936, Serial No. 71,111
In Germany March 28, 1935

1 Claim.  (Cl. 250—11)

The invention relates to the art of direction finding by means of amplitude- or phase-compensation between individual antenna groups. This compensation, according to my invention, is obtained electrically rather than by physical orientation of the antennae.

In the accompanying drawing to which reference is made in the following description:

Fig. 1 shows two groups of dipole antennae arranged to collect the energy of an echelon radio beam.

Figure 1:
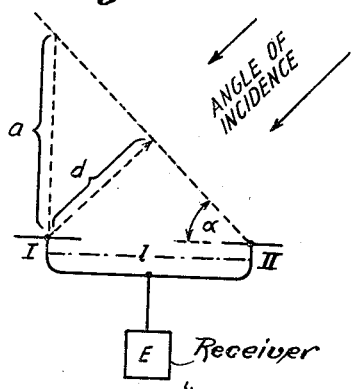
Figures 1, 2 and 3 are diagrammatic showings of receiving antenna arrays.
Figure 2:
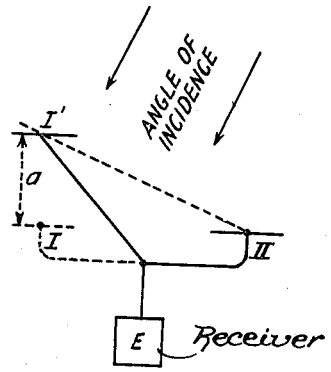

The energy is, in this instance, collected by the two dipoles in equal phase. The radiation from the transmitter has an angle of incidence $\alpha$ to be determined for the direction finding. In view of the elongation $d$ there exists a phase delay equal to $$\frac{d.2\pi}{\lambda}$$

of the antenna I relative to the antenna II. In order to measure the angle $\alpha$ the antenna was hitherto turned until the phase delay in the antenna I became zero. As shown in Fig. 2, it is also possible to displace the antenna I in a parallel direction by the value $a$, until a maximum or minimum of the reception is established. The distance $a$ is a measurement for $\alpha$, namely $$\tan \alpha = \frac{a}{l}$$

In view of the spacial movement of the entire antenna system, these methods are inconvenient.

Figure 3:
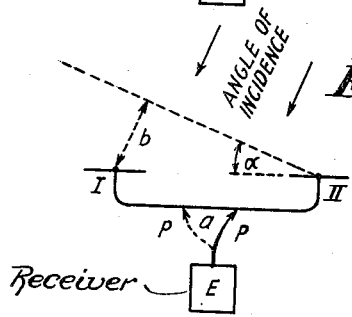

The method can be simplified if, instead of obtaining the phase correction through varying the location of the antenna array, this correction is carried out electrically. In accordance with the invention, this is done by means of variable connection lines between the individual antenna groups. Fig. 3 shows the principle of the arrangement. The line to the receiver can be displaced at the connection line between antenna I and antenna II. The required displacement $d$ is then equal to $b.2\pi$, or if $l$ is given, it is $2.l \sin \alpha$, wherefrom $\alpha$ can be determined. At suitable gauging the displacement $d$ can be read at the connection line directly in angle degrees $\alpha$. The arrangement may be simplified still further by replacing the geometrical displacement of the connection point of the receiver designated by P by an electrical displacement which depends upon impedance ratios between different connecting lines.

Figure 4A:
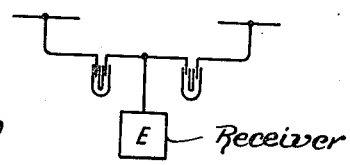
Figs. 4a and 4b illustrate two different but preferred embodiments of the invention.
Figure 4B:
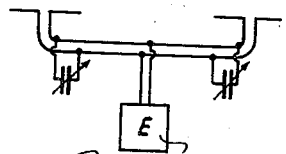
Figure 5:
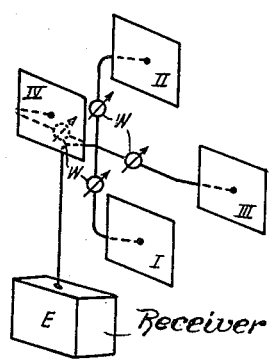
Fig. 5 illustrates a method of phase correction which I may use in carrying out my invention.

This idea of the invention is shown in two examples in the Figs. 4a and 4b. It is herein indicated that the compensation may be obtained by means of series impedances (Fig. 4a) as well as by means of parallel impedances (Fig. 4b). The arrangements for horizontal direction finding (marine, or aircraft) hitherto described may obviously also be adapted correspondingly for air navigation, that is, for spacial direction finding. Thus Fig. 5 shows an example in which the phase correction between the groups of antennae I to IV is obtained by means of variable impedances W inserted in the connection lines. The variable condensers and inductances shown in Figs. 4a and 4b may obviously also be substituted by discharge tubes with electric remote control.

Figure 6:
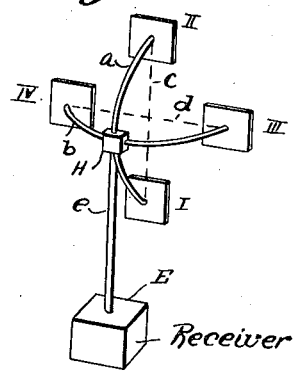
Fig. 6 illustrates a further modification of antenna systems which I have found suitable in carrying out my invention.

In accordance with Fig. 6 an antenna system having four principal energy collectors I, II, III and IV is provided. These energy collectors are mounted at the ends of two semi-circularly shaped supporting rods $a$ and $b$ which serve as transmission lines. Both these rods extend through a holder H having holes therein through which the rods may be slipped into any suitable position of adjustment along their arcuate lengths. The plane defined by the four terminals of the supporting rods $a$ and $b$ may be considered as having two rotational axes $c$ and $d$ lying therein. Thus, when an adjustment of the supporting rod $a$ is made for shifting the point of support within the holder H it virtually has the effect of rotating the other supporting rod $b$ about the axis $d$. On the other hand, when the supporting rod $b$ is shifted within the holder H it has the effect of virtually swinging the supporting rod $a$ about the axis $c$.

Since the semi-circular supporting rods $a$ and $b$ act as transmission lines for feeding energy to the receiver E by way of the vertical support $e$, it may readily be seen that a proper phasing of the energy collected on different antenna members I—IV may be accomplished by the adjustment of the lengths of the arms $a$, $b$, thereby to position the holder H at a nodal point for all of the energy. In other words, the holder H may be shifted to any suitable position in the hemispherical surface within which the two supporting arms $a$ and $b$ lie. It is, therefore, possible to orient the four energy collecting members I—IV in any spacial direction for the sake of obtaining a maximum signal response in the receiver E. This arrangement has been found to be very convenient in operation and leads to the accurate determination of the direction from which a given signal may be received.

I claim:

A direction finding system comprising a plurality of fixed receiving antenna units in combination with a radio receiver, means including a pair of semi-circularly formed conductors the ends of which are connected respectively to different ones of said antenna units for feeding energy therefrom to said receiver, said conductors being arranged to contact with one another at a point of intersection of two arcs along which said conductors are disposed, said means including also a common conductor from said point of intersection to said receiver, and means for adjusting the phase relationships between the energies fed into said common conductor from the several antenna units, the last said means being constituted by a device adapted to vary the point of contact between said semi-circular conductors with respect to the terminals thereof.

KARL FRITZ.